No. 889,392. PATENTED JUNE 2, 1908.
H. M. NEUHAUS.
HAY LOADER.
APPLICATION FILED SEPT. 5, 1907
2 SHEETS—SHEET 1.
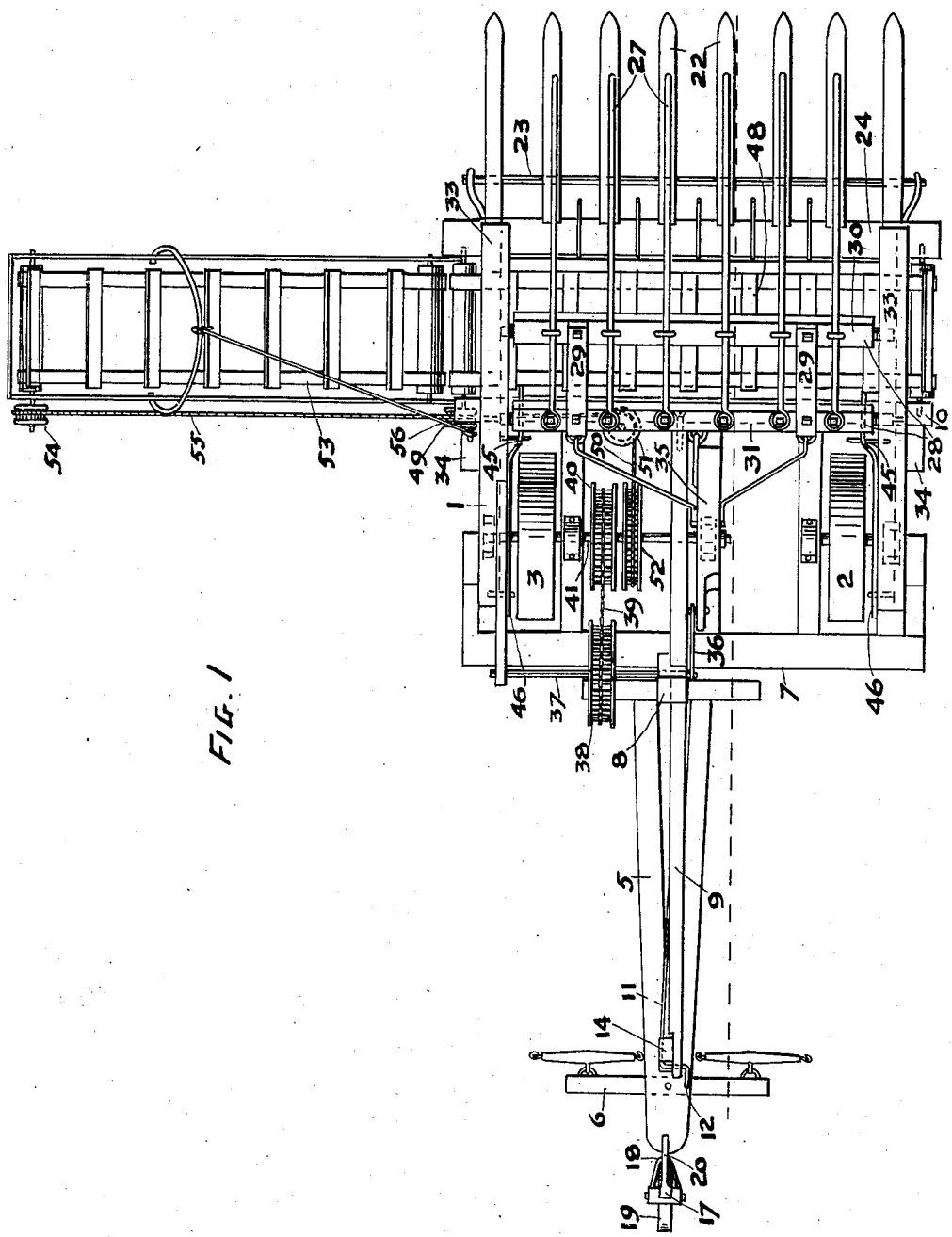
WITNESSES:
N. Keating
Leon Boillot
INVENTOR,
Henry M. Neuhaus,
BY
F. M. Wright,
ATTORNEY.

No. 889,392. PATENTED JUNE 2, 1908.
H. M. NEUHAUS.
HAY LOADER.
APPLICATION FILED SEPT. 5, 1907.
2 SHEETS—SHEET 2.
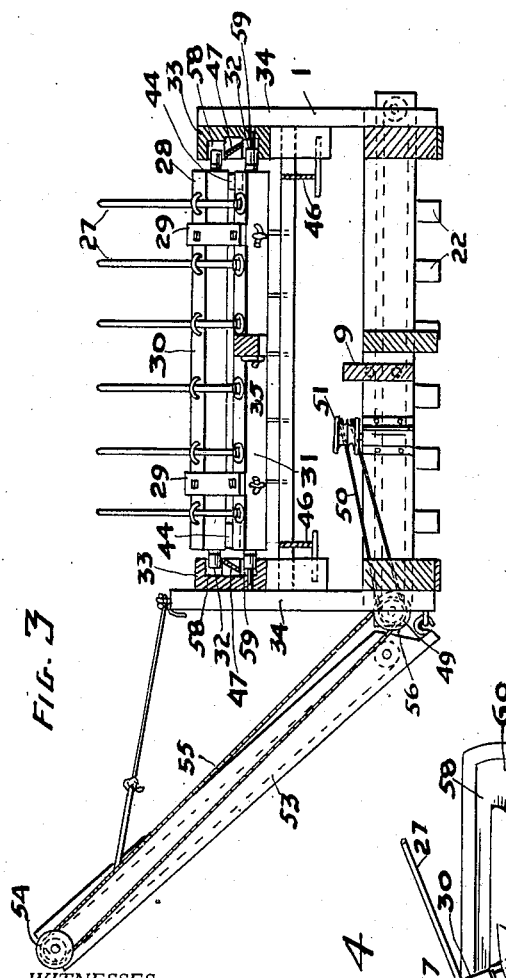
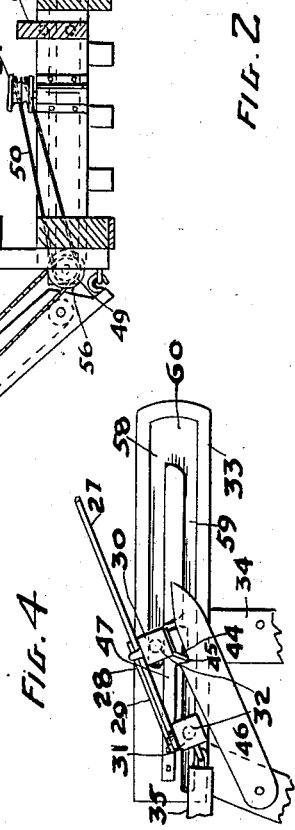
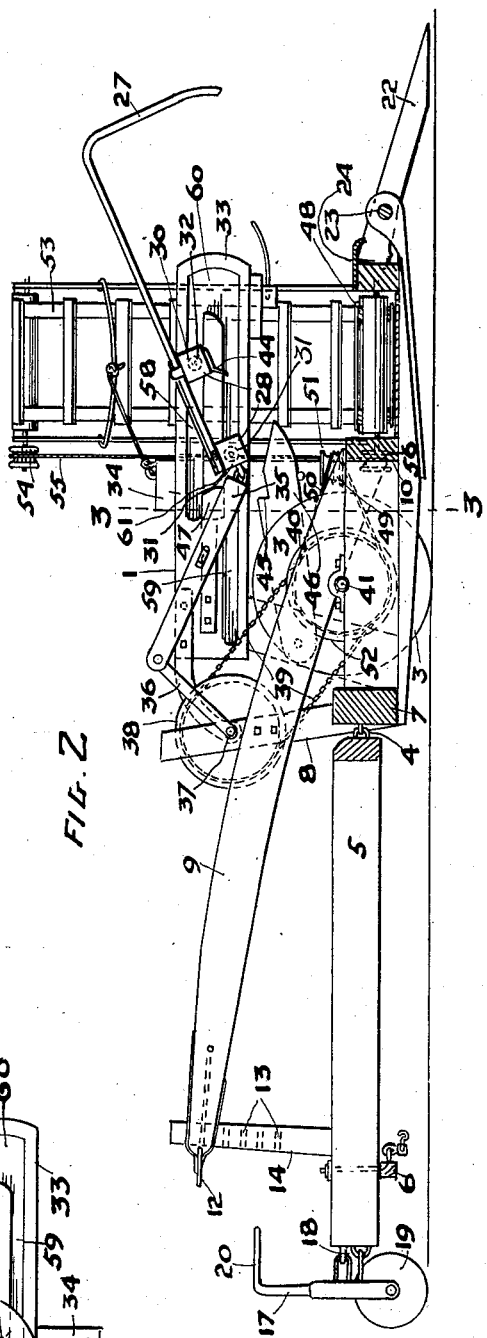
WITNESSES:
N. Keating
Leon Boilloc
INVENTOR,
Henry M. Neuhaus,
BY
F. M. Wright,
ATTORNEY

UNITED STATES PATENT OFFICE.

HENRY M. NEUHAUS, OF SUSANVILLE, CALIFORNIA.

HAY-LOADER.

No. 889,392.  Specification of Letters Patent.  Patented June 2, 1908.

Application filed September 5, 1907. Serial No. 391,434.

*To all whom it may concern:*

Be it known that I, HENRY M. NEUHAUS, a citizen of the United States, residing at Susanville, in the county of Lassen and State of California, have invented new and useful Improvements in Hay-Loaders, of which the following is a specification.

The object of the present invention is to provide a machine for loading hay on to a wagon from the field.

In the accompanying drawings, Figure 1 is a plan view of the machine; Fig. 2 is a longitudinal section of the same; Fig. 3 is a cross section of the same on the line 3—3 of Fig. 1; Fig. 4 is a detail of one of the lifters.

Referring to the drawing, 1 indicates the frame of the machine, which is mounted upon wheels 2, 3, and to the rear of which is pivotally attached, as shown at 4, the tongue 5 for propelling the machine over the ground, by means of a pair of horses attached to said tongue by the doubletree 6. Upon the rear bar 7 of said frame is a post 8, and an upwardly and rearwardly inclined beam 9 is attached to its front end to the transverse bar 10 of the frame, and is also secured to the post 8, its extended rear end carrying a spring latch 11 having a handle 12, adapted to engage any one of a vertical series of notches 13 in a post 14 on the tongue 5, whereby the main frame 1 of the loader may be secured at any angle to the tongue. In order to turn the machine to the right or to the left, there is provided a steering bar 17, pivoted at 18 upon the end of the tongue 5 and having mounted in its forked lower end a steering wheel 19, so that by means of the handle 20 said steering bar may be turned to either side, thus guiding the machine in the desired direction.

In the front end of the main frame of the machine the teeth 22 of a fork, are pivotally mounted upon a cross bar 23, their rear ends abutting against the under side of a spring plate 24, which allows of a certain freedom of movement of said fork teeth as they move over uneven ground. The hay having been cut in the ordinary manner and raked into wind rows, the fork passes beneath the hay, as the machine travels. The hay is then drawn back from the fork by means of a rake having bent teeth 27 secured to a rake frame 28 comprising two transverse bars 29 secured together by longitudinal bars 30, 31. The ends of said bars 30, 31 carry rollers 32 which move in grooves formed in the inner sides of guideways 33 secured by posts 34 upon the frame 1. To the rear end of said rake is pivotally attached a link 35 connected with a crank arm 36 on a shaft 37 carrying a sprocket wheel 38, around which passes a sprocket chain 39, which also passes around a sprocket wheel 40 on a shaft 41 which forms an extension of the shaft to which the wheel 2 is fixedly secured so that said wheel 40 is rotated by the motion of the latter wheel 2, as the machine travels over the ground. Thereby there is imparted to said rake a motion of reciprocation.

The guideways 33 have at each side an upper groove 58 and a lower groove 59, said grooves being parallel, and connected at the forward ends by a vertical groove 60 and at the rear end of the groove 58 by a vertical groove 61. The lower groove 59 is longer than the upper groove 58 and extends farther to the rear. Supposing the parts to be in the position shown in Fig. 2, in which case the rake is moving forwards, when the rollers 32 on the front bar 30 arrive at the front ends of the upper grooves 58, they drop in the vertical grooves 60 into the lower grooves 59, and then move rearward in said grooves. The rollers mounted on the ends of the rear cross bar 31 move rearwardly in the lower grooves past the rear ends of the upper grooves, but when the rollers mounted on the front cross bar 30 arrive just beneath the rear ends of the upper groove, dogs 44 attached to said front cross bar engage notches 45 in pivoted lifter arms 46, and are thereby arrested in their rearward motion, the only movement permissible being an upward swinging movement, causing the rollers 32 on the front bar 30 to pass spring latches 47, so that said rollers are thereby carried into the upper groove, and the rake again assumes the inclined position shown in Fig. 2. In this position it advances to the end of its upward movement and then again drops to a horizontal position, and in this position moves rearwardly. The hay is thus raked onto a draper 48 which is actuated by means of sprocket wheel 49 driven by a sprocket chain 50 passing around idle wheels 51, and around a sprocket wheel 52 on the extension shaft 41. By this draper the hay is conveyed to an inclined draper 53 by which it may be delivered to the hay loader, said latter draper being driven in like manner by a sprocket wheel 54 and sprocket chain 55 from a sprocket wheel 56 upon the same shaft as the sprocket wheel 49.

I claim:—

In a hay loader, the combination with a frame and wheels for moving it over the ground of a fork adapted to pass beneath the hay, and means for raking the hay comprising a rake, an operative connection between said rake and a wheel whereby as the frame moves, the rake is alternately retracted and advanced, and guiding mechanism for the rake arranged automatically to maintain the front end of said rake in a lower position while being retracted and to maintain it raised while the rake is advanced, comprising upper and lower longitudinal grooves, rollers carried by the rake and movable in said grooves, and automatic means for raising the front rollers into the upper grooves when the rake arrives at the rear end of its reciprocation and permitting them to drop when the rake arrives at the front end thereof, said means comprising pivoted lifters and devices carried by said rake and adapted to engage said lifters to lift said devices in the rearward movement of rake to move said front rollers into the upper grooves, substantially as described.

In testimony whereof I have hereunto set my hand in the presence of two subscribing witnesses.

HENRY M. NEUHAUS.

Witnesses:
H. PARDEE-BANGHAM,
NOBLE S. McKINSEY.